May 12, 1970   R. R. DAY   3,511,133
POSITION CONTROL FOR HYDRAULIC JACKS
Filed March 6, 1968   2 Sheets-Sheet 1

INVENTOR
RALPH R. DAY

BY
*Fryer, Tjensvold, Feix, Phillips & Lempio*
ATTORNEYS

May 12, 1970  R. R. DAY  3,511,133
POSITION CONTROL FOR HYDRAULIC JACKS
Filed March 6, 1968  2 Sheets-Sheet 2

INVENTOR
RALPH R. DAY
BY
Fryer, Zinsvold, Feix, Phillips + Lempio
ATTORNEYS

United States Patent Office 3,511,133
Patented May 12, 1970

3,511,133
POSITION CONTROL FOR HYDRAULIC JACKS
Ralph R. Day, Aurora, Ill., assignor to Caterpillar Tractor Co., Peoria, Ill., a corporation of California
Filed Mar. 6, 1968, Ser. No. 710,874
Int. Cl. F15b 13/16; F01b 31/00
U.S. Cl. 91—388
9 Claims

ABSTRACT OF THE DISCLOSURE

In three embodiments of a hydraulic jack operated by a detented control valve, its rod and cylinder interact to internally form a chamber of varying volume as the rod approaches a selected operating limit within the cylinder. Fluid from the chamber is communicated to and acts upon a spring-loaded slave cylinder to release the detented control valve when sufficient fluid pressure is provided by decreasing volume of the chamber.

---

Where hydraulic jacks are employed, for example, to accomplish tilting or lifting of buckets and other implements on earthmoving machinery, it is common practice to employ detented control valves for operating the jacks. The use of detented control valves permits the operator to initially set the control valve and then direct his attention elsewhere during operation of the jack. Such detented controls are commonly accompanied by an automatic kick-out which releases the control and permits it to return to a neutral position when the implement is properly positioned by the jack. Automatic kick-outs have taken the form of cams mounted on the implement or on a sliding or "trombone" assembly secured to the jack. When the implement is properly positioned, the cam contacts and actuates a switch or hydraulic valve which employs fluid from a separate hydraulic circuit to release the detented control. The externally mounted kick-out components are exposed to fouling by weather conditions or environmental dirt and dust as well as being exposed to damage by rocks, tree limbs and other debris. In addition, the numerous hydraulic lines in these arrangements commonly develop leaks so that additional time and expense is required for maintenance.

The present invention overcomes these problems by providing a position control where portions of a hydraulic motor cooperate to form a chamber of varying volume as its piston approaches a selected operating limit in its cylinder. Suitable means for releasing a detented control valve for the motor are responsive to pressure variations caused by the varying volume of the chamber.

Thus, the position control of the present invention may be disposed in a location where it is protected from damage or fouling. Since many of its components are preferably positioned within and partially formed by the hydraulic motor, the present position control is mechanically simple and of economical construction. For the same reasons the present position control minimizes the possibilities of fluid leakage.

Other objects and advantages of the invention are made apparent in the following description having reference to the accompanying drawings wherein.

Figure 1:
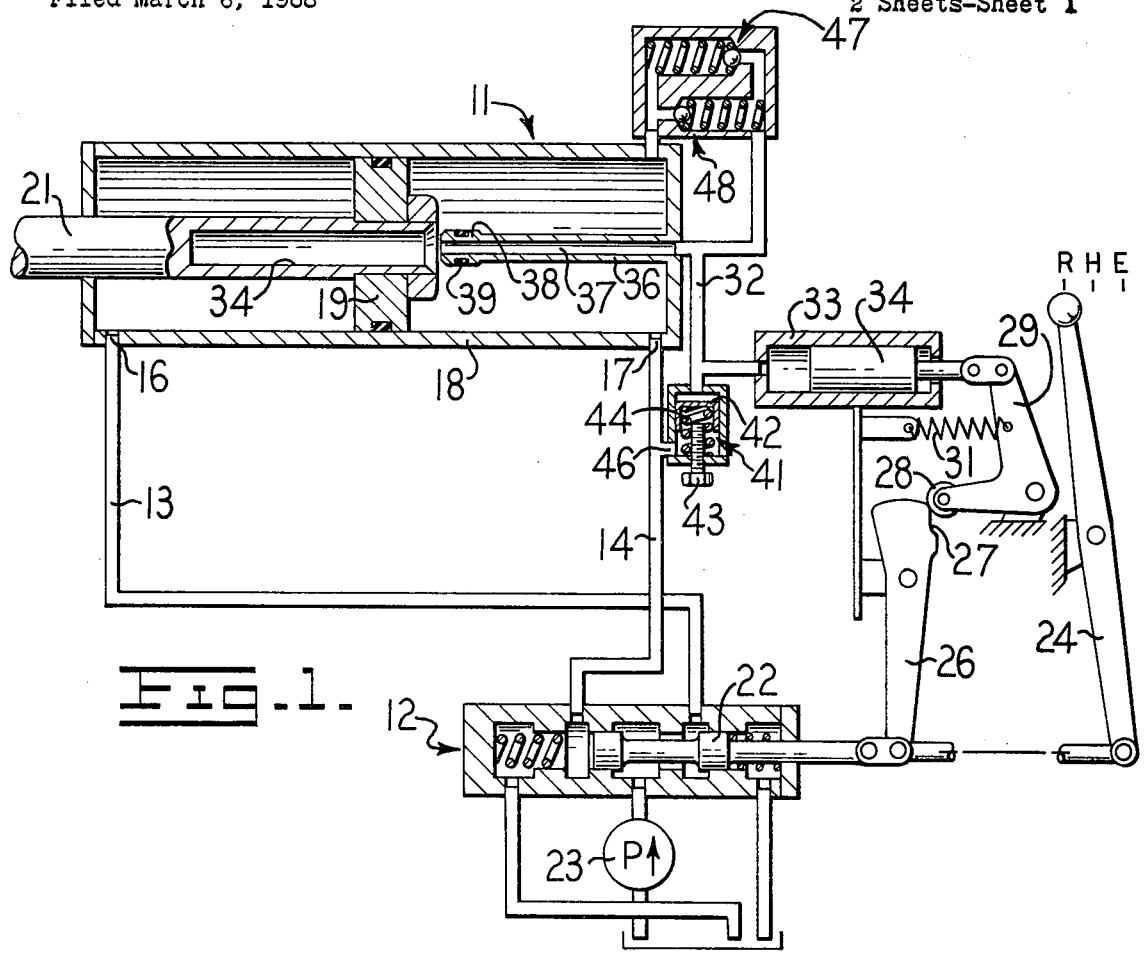
FIG. 1 is a schematic view, with parts in section, of a hydraulic motor operable by a detent control assembly and incorporating the present invention.

Referring now to FIG. 1, operation of a hydraulic motor or jack 11, of a type suitable for positioning an implement of an earthmoving machine for example, is regulated by a hydraulic control valve 12. The valve 12 is communicated with the rod end and head end of the jack by conduits 13 and 14 which are in respective communication with ports 16 and 17 in the jack cylinder 18. The jack is of a conventional type having a piston 19 and a rod 21 which is slidable through the rod end of the cylinder. To retract the rod and piston within the cylinder, fluid is introduced under pressure through the conduit 13 into the rod end of the jack. Similarly, the rod and piston are extended from the cylinder by the introduction of fluid under pressure from the conduit 14 into the head end of the jack. The control valve 12 has a spool 22 which is spring-centered in a neutral or hold position where it isolates both ends of the jack from a fluid source 23 and thus prevents operation of the jack. The control valve spool is linked to a lever 24 which is normally in a hold position, indicated at H, when the spool is centered by its springs. To operate the jack, the lever is rotated, for example counter-clockwise to a retract position R, as shown in FIG. 1, so that the spool 22 is shifted rightwardly and communicates the pump 23 with the rod end of the jack. To maintain the control valve spool in this position without continued pressure upon the lever, a pivotal detent lever 26 is connected for rotation with the lever. As the control lever is rotated counter-clockwise into its retract position, the detent lever 26 is also rotated counter-clockwise so that its detent surface 27 is engaged by a roller 28. The roller 28 is mounted on one arm of a pivotal bell crank member 29. A spring 31 is connected to the other arm of the bell crank member to urge the roller downwardly and maintain its detent engagement with the lever 26. By this means, the control valve spool and lever are maintained in their retract positions until a clockwise force is applied to the bell crank 29 to release the detent lever and permit the spool to be centered on its springs.

To provide a suitable kick-out for the detent mechanism which operable when the jack is retracted to a selected position, the present invention provides a chamber with varying volume according to the piston 19 positioned in the hydraulic cylinder 18. Formation of the chamber is described below. Fluid from the chamber is communicated by a conduit 32 to a slave cylinder 33 having a slidable piston 34 which is connected to the bell crank member. Introduction of fluid under pressure into the slave cylinder 33 causes extension of the piston 34 so that it urges the bell crank member 29 in clockwise fashion against the spring 31. Pressure in the slave cylinder 33 increases as the volume of the above described chamber decreases so that the slave cylinder is operated to release the control valve when the rod 21 is retracted to a selected position within the cylinder 18.

The variable volume chamber comprises a rod 21 having an axial bore 34 opening toward the head end of the cylinder 18. A tubular plunger 36 is secured to the head end of the cylinder 18 in axial alignment with the rod bore and extends into the cylinder 18 to be received within the rod bore as the rod is retracted within the cylinder. The plunger 36 has a bore 37 which is in communication with the conduit 32. The inwardly extending end 38 of the plunger has a diameter approximately equal to that of the rod bore and is sealed with suitable means 39. The variable volume chamber referred to above is formed by the rod bore and the plunger bore 37 after the plunger enters into the rod bore during retraction. With the rod 21 positioned as shown, hydraulic fluid from the head end of the jack enters the rod bore and the plunger bore 37 for subsequent transmission of pressure to the slave cylinder 33. As the rod 21 moves rightwardly during retraction, the chamber is closed as described above to fix the amount of fluid contained therein. Because of the difference of inside diameters of the rod bore and the plunger channel 37, the volume of the chamber decreases as the rod is retracted further into the cylinder. Decreasing volume of the chamber forces the fluid through the conduit 32 and into the slave cylinder 33 at increasing pressure until it is sufficient to overcome the spring 31 and thus raise the roller 28 for release of the control valve 12.

To permit variation of the rod position within the cylinder at which the slave cylinder overcomes the spring 31, an adjustable volume accumulator 41 is also in communication with the conduit 32. The accumulator 41 has a slidable piston 42 which is urged downwardly against a spring 44 in the accumulator by fluid pressure in the conduit 32 so that fluid from the conduit 32 is received within the accumulator prior to operation of the slave cylinder 33. Downward motion of the piston 42 and accordingly the fluid volume received within the accumulator is adjustable by means of a screw 43 which is positioned to engage the piston as it moves downwardly within the accumulator. The spring 44, tending to reposition the piston 42, ensures ejection of fluid from the accumulator after operation of the slave cylinder 33 and extension of the rod 21 so that it will again be effective upon subsequent retraction of the jack.

With the screw 43 set to substantially prevent any downward motion of the piston 42, the slave cylinder 33 is operated shortly after the plunger 36 enters the bore 34. Substantially all of the fluid forced out of the decreasing volume of the bore 34 is then forced to act directly upon the slave cylinder. As the screw 43 is adjusted to permit increased motion of the piston 42, fluid from the bore 34 is first received within the accumulator 41 so that the slave cylinder is not operated until the rod 21 reaches a further retracted position within the cylinder.

To ensure that the accumulator piston is not depressed by excessive back-pressure in the head end of the cylinder, with the jack in the position as shown in FIG. 1, fluid from the conduit 14 is communicated to the back of the piston 42 through a port 46. With this balancing arrangement the accumulator is prevented from operating except in response to the decreasing volume within the rod bore 34. The balancing port 46 may be eliminated where there is no danger of such excessive back-pressures.

In some instances, the operator may wish to further retract the cylinder without having to first adjust the accumulator 41. Normally, this would result in excessive pressure in the conduit 32 and the slave cylinder since there would be no relief for fluid during further volume reduction of the rod bore 34. To permit continued retraction, a relief or one-way check valve 47 is disposed between the head end of the cylinder 18 and the conduit 32. Fluid under excessive pressure in the conduit 32 is thus relieved across the valve 47 back into the cylinder head. Upon operation of the relief valve, an additional problem is raised in that the reduced quantity of fluid in the conduit 32 and the chamber formed by the passage 37 and bore 34 could cause equally undesirable vacuum conditions during subsequent extension of the jack. To overcome this problem, a makeup or one-way check valve 48 is disposed between the head end of the jack and the conduit 32 to permit fluid flow from the head end of the jack into the conduit 32. Thus the embodiment of the present position control illustrated in FIG. 1 provides an effective means for limiting retraction of the hydraulic jack 11.

Figure 2:
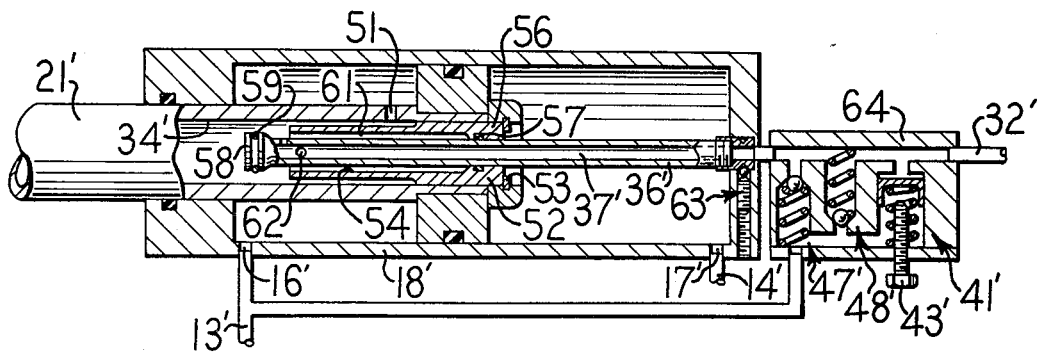
FIG. 2 is a partial view, in section, illustrating an alternate embodiment of the invention.

Having reference now to FIG. 2, an alternate embodiment of the hydraulic jack and positioning control is illustrated for similarly limiting extension of the jack. Portions of this embodiment which are similar to those in FIG. 1 are indicated by primed numerals. In this embodiment, the variable volume chamber is to be formed during extension of the jack and hydraulic fluid from the rod end of the jack is to be employed within the chamber. Accordingly, the rod bore 34' is in communication with the rod end of the cylinder by means of a passage 51 formed in the rod. An insert 52 is secured in the open end of the rod bore 34' by means of a snap ring 53. The insert 52 forms a smaller bore 54 and has an end portion 56 of reduced diameter with seal means 57 for continuous sealing engagement with the plunger 36'. The end 58 of the plunger closes the plunger passage 37' and is of increased diameter approximately equal to the smaller insert bore 54. Seal means 59 is mounted on the plunger end so that as the rod is extended the insert bore 54 receives the plunger end in sealing relation. The variable volume chamber is formed by the plunger bore 37' in cooperation with an annular space 61 formed between the insert bore 54 and the plunger. The passage 37' and space 61 are in communication by means of a passage 62 formed in the plunger wall. To permit assembly of these components within the hydraulic cylinder, the plunger 36' is formed separately from the cylinder 18' and is secured at the head end of the cylinder by means of a set screw arrangement 63. The conduits 13' and 14' are connected to a control valve and the conduit 32' is connected with a slave cylinder similar to the arrangement of FIG. 1.

Prior to extension of the jack, the chamber to be formed by the annular space 61 and the plunger passage 37' is in communication with the rod end of the jack by means of the passage 51 to permit filling of the chamber components with hydraulic fluid. As the rod is extended leftwardly from the jack cylinder, the enlarged end of the plunger seals off the annular space 61 to form the variable volume chamber. In the embodiment of FIG. 2, the adjustable accumulator 41' and the relief and makeup valves 47' and 48' are disposed in a single housing 64 which may be secured to the cylinder or positioned in the operator's station to facilitate adjustment of the accumulator 41'. In this manner, the position control of FIG. 2 limits extension of the hydraulic jack at a point determined by the setting of the accumulator and continued extension past that point is permitted by means of the relief valve 47' and the makeup valve 48'.

Figure 3:
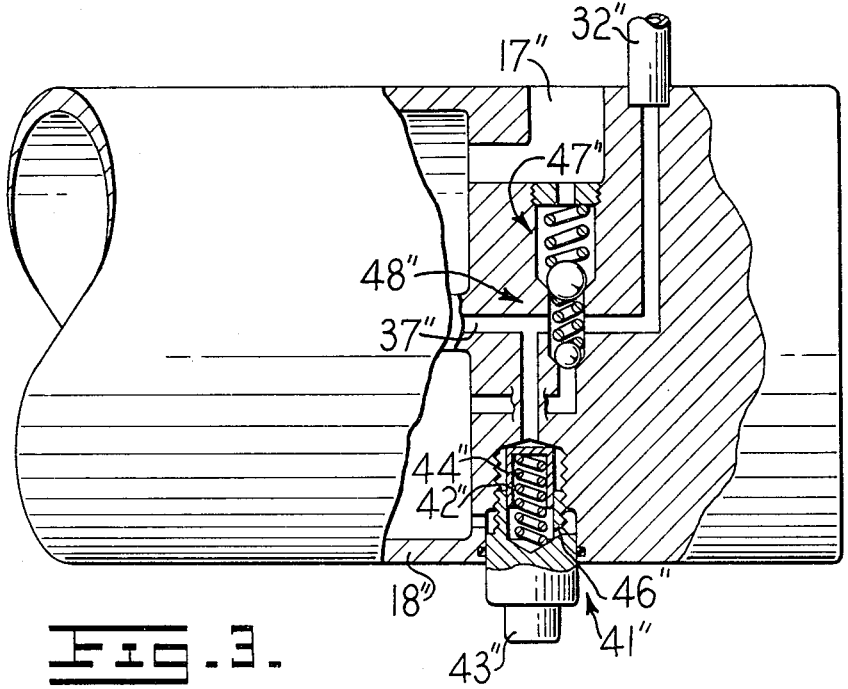
FIG. 3 is a fragmentary view of one end of the motor of FIG. 1 with associated components of the invention disposed in one end of the cylinder.

A variation of the embodiment of FIG. 1 is represented in FIG. 3 to illustrate a mechanically simplified design wherein the accumulator 41'', relief valve 47'' and makeup valve 48'' are disposed within an integral portion of the hydraulic cylinder 18''. The plunger bore 37'' is extended through the cylinder end to be in communication with the components arranged therein and with the external conduit 32'' which communicates with a slave cylinder as described in FIG. 1. The design variation of FIG. 3 simplifies the design of the position control and further reduces the possibility of fluid leakage since the accumulator 41'' and the check valves 47'' and 48'' are disposed within the cylinder.

Figure 4:
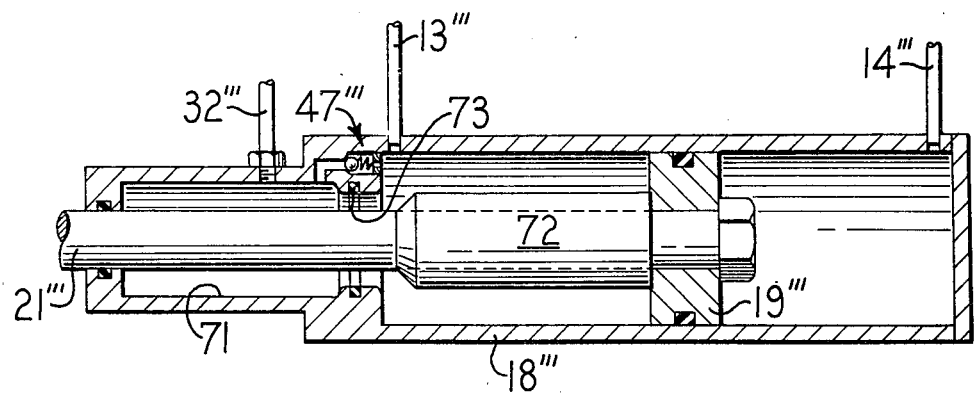
FIG. 4 is a view similar to FIG. 2 of another alternate embodiment.

Still another alternate embodiment of the position control assembly of FIG. 1 is illustrated in FIG. 4 and provides another method for limiting extension of the jack. Here again, components similar to those in FIG. 1 are indicated by means of a triple prime numeral. In this embodiment, the variable volume chamber is formed by a cylindrical portion 71 of the cylinder at its rod end which is to be closed by a sleeve or enlarged diameter portion 72 of the rod 21''' adjacent the piston 19'''. During extension of the jack, the sleeve 72 is received in sealing relation by seal means 73 to form the variable volume chamber in cooperation with the cylinder end portion 71. The conduit 32''' is in communication with the cylinder end portion 71 and with a slave cylinder similar to that illustrated in FIG. 1. A control valve (not shown) similar to that described in FIG. 1 is to be associated with the conduits 13''' and 14'''. The relief valve 47''' is illustrated to provide fluid communication from the cylindrical end portion 71 to the rod end of the cylinder 18'''. A variable accumulator and a makeup valve may be employed with this embodiment in a similar manner as those described in FIG. 1 or FIG. 2. The embodiment in FIG. 4 is mechanically simplified over that illustrated in FIG. 2. However, it requires additional modification of the cylinder 18''' in order to provide the cylindrical end portion 71.

What is claimed is:

1. In a hydraulic system having a hydraulic motor including a cylinder defining a cylindrical chamber with piston means positioned for longitudinal movement within the chamber and a control valve for directing fluid under pressure to the cylinder chamber and regulating the position of the piston means within the chamber, the combination comprising a portion of the piston means and a coaxially aligned internal portion of the cylinder being effective to close and form an additional chamber as the piston means approaches an operating limit within the cylinder, volume of the additional chamber being variable by relative movement of the piston means and cylinder while the additional chamber is closed, and release means in communication with the variable volume chamber and associated with the control valve, the release means being operable by fluid from the variable volume chamber to terminate operation of the motor.

2. The invention of claim 1 wherein the cylinder has a head end and a rod end, the piston means including a piston and a rod secured to the piston and slidably penetrating the rod end of the cylinder, the internal portion of the cylinder being a tubular plunger extending inwardly from the head end of the cylinder, the rod defining a generally axial bore, the plunger and bore being coaxially aligned to form the variable volume chamber as the piston means approaches its operating limit, the tubular passage of the plunger being in communication with the release means.

3. The invention of claim 2 wherein the tubular plunger is received in sealed relation by the rod bore as the rod and piston are retracted into the cylinder.

4. The invention of claim 1 further comprising adjusting means for varying the piston means position within the cylinder at which the motor operation is terminated.

5. The invention of claim 4 further comprising relief means to permit overriding operation of the motor past the selected operating limit.

6. The invention of claim 5 wherein the control valve tends toward a position preventing operation of the motor but is maintained in another operating position by suitable detent means and the release means is a slave cylinder operable to release the detented valve in response to a selected pressure provided therein.

7. The invention of claim 6 wherein said relief means is a one-way check valve permitting fluid at a selected pressure to flow from the variable volume chamber to one end of the cylinder, another check valve permits make-up fluid to flow from the one cylinder end to the variable volume chamber and the adjusting means comprises a slidable spring-loaded piston for admitting fluid from the variable volume chamber to a piston chamber according to adjustable spring means acting on the piston.

8. The invention of claim 2 wherein the rod bore is in communication with the rod end of the cylinder by means of a suitable fluid inlet, the rod bore being restricted at its outer end for continued sealing engagement with the plunger, the end of the tubular plunger being closed and of increased diameter for sealing engagement with the rod bore to close at least a portion of the rod bore from the fluid inlet during extension of the piston means, the closed portion between the rod bore and plunger being in communication with the tubular channel of the plunger and cooperating therewith to form the variable volume chamber.

9. The invention of claim 1 wherein the cylinder has a head end and a rod end, the piston means including a piston and a rod secured to the piston and slidably penetrating the rod end of the cylinder, a portion of the cylinder at its rod end is of reduced diameter and the diameter of the rod is increased adjacent the piston so that the rod portion of increased diameter is received by and closes the reduced diameter portion of the cylinder to form the variable volume chamber as the rod and piston are extended from the cylinder, the reduced diameter cylinder portion being in communication with the release means.

References Cited
UNITED STATES PATENTS

| | | | |
|---|---|---|---|
| 2,320,508 | 6/1943 | Burns et al. | 91—388 |
| 3,063,425 | 11/1962 | Vier et al. | 91—388 |

PAUL E. MASLOUSKY, Primary Examiner

U.S. Cl. X.R.

91—394; 92—108, 110